United States Patent
Verma et al.

(10) Patent No.: US 11,339,922 B2
(45) Date of Patent: May 24, 2022

(54) VENTILATED THREE DIMENSIONAL STRUCTURE FROM ADDITIVE MANUFACTURE FOR EASY POWDER REMOVAL DURING POST PROCESS

(71) Applicant: National Taiwan University of Science and Technology, Taipei (TW)

(72) Inventors: Saurav Verma, Taipei (TW); Jeng-Ywan Jeng, Taipei (TW); Ajeet Kumar, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 99 days.

(21) Appl. No.: 16/925,330

(22) Filed: Jul. 9, 2020

(65) Prior Publication Data
US 2022/0010927 A1 Jan. 13, 2022

(51) Int. Cl.
*F16S 5/00* (2006.01)
*B33Y 80/00* (2015.01)
*B22F 5/00* (2006.01)

(52) U.S. Cl.
CPC .............. *F16S 5/00* (2013.01); *B33Y 80/00* (2014.12); *B22F 5/00* (2013.01)

(58) Field of Classification Search
CPC ......... G06T 17/00; B33Y 10/00; B33Y 80/00; B22F 5/00
See application file for complete search history.

(56) References Cited

U.S. PATENT DOCUMENTS

| | | | |
|---|---|---|---|
| 10,704,841 B2 * | 7/2020 | Manzo | F28F 27/00 |
| 10,842,634 B2 * | 11/2020 | Pasini | A61F 2/3662 |
| 2006/0147332 A1 * | 7/2006 | Jones | A61F 2/30907 419/8 |
| 2006/0241776 A1 * | 10/2006 | Brown | A61B 17/7225 623/20.16 |
| 2012/0215310 A1 * | 8/2012 | Sharp | B33Y 10/00 623/11.11 |
| 2014/0014493 A1 * | 1/2014 | Ryan | B01D 61/364 203/89 |
| 2017/0030519 A1 * | 2/2017 | Kuczek | F28F 3/086 |
| 2017/0095337 A1 * | 4/2017 | Pasini | A61L 27/56 |
| 2017/0176977 A1 * | 6/2017 | Huang | G05B 19/4099 |
| 2020/0272131 A1 * | 8/2020 | Wang | G05B 19/4099 |

FOREIGN PATENT DOCUMENTS

WO    WO-9933641 A1 *  7/1999  ............ A61L 27/56

* cited by examiner

*Primary Examiner* — Jacob J Cigna (57) ABSTRACT

The proposed lattice structure is designed to simplify the time of long and difficult post-printing process of removing the unused powder or resin by blowing air in the additive manufacturing parts. The designed lattice structure is a ventilated three dimensional structure that includes a plurality of lattice bodies arranged in a first direction, a second direction and a third direction. The first direction, the second direction and the third direction are orthogonal. Each of the lattice body has a hollow structure formed by a shell wall including a first venting hole opening in the first direction and facing the first venting hole of another adjacent lattice body, a second venting hole opening in the second direction and facing the second venting hole of another adjacent lattice body; and a third venting hole opening in the third direction and facing the third venting hole of another adjacent lattice body.

20 Claims, 8 Drawing Sheets

FIG. 1

(Prior Art)

VENTILATED THREE DIMENSIONAL STRUCTURE FROM ADDITIVE MANUFACTURE FOR EASY POWDER REMOVAL DURING POST PROCESS

BACKGROUND OF THE INVENTION

Field of the Invention

The invention relates to a technical field of additive manufacturing, and more particularly to a ventilated three dimensional structure made from additive manufacturing.

Description of the Related Art

Additive manufacturing (three-dimensional printing technology) is a rapid forming technology for three dimensional products. As for the additive manufacturing technology, a three-dimensional model for the three dimensional product is constructed and divided into several planar layers. The raw material is processed in a carrier layer by layer according to the designed processing positions of each planar layers, and the processing material is combined with the materials of the previous formed layer, whereby the processed layers are stacked to obtain a three dimensional structure.

The processing method selected for additive manufacture depends on the material used therefor. For example, a three-dimensional photo curing molding technology (SLA) is selected for liquid photosensitive resin material cured layer by layer with UV light. A volumetric molding technology (FDM) is selected for a molten material deposited and then cooled for solidification layer by layer. A three-dimensional powder bonding technology (3DP) and a selective laser sintering technology (SLS) are selected for powder material bonded to each other by addition of adhesive material or emission of a laser beam. After one layer of the powder material is processed and bonded, a base carrying the powder material descends and a new layer of the powder material is provided on the previous layer, and afterwards the new layer of powder material is successively processed, whereby a three-dimensional product is completed by the stack of the processed layers.

Figure 1:
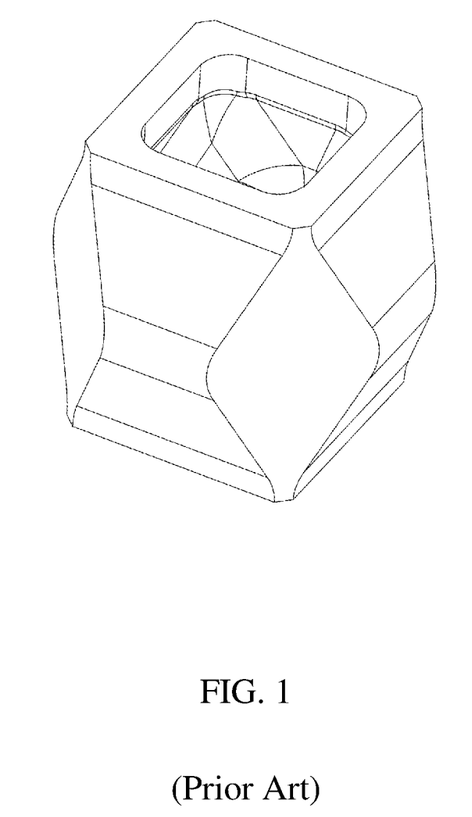
FIG. 1 is a perspective view of a lattice body of a conventional three-dimension structure from additive manufacture.

For the aforementioned processing technology selected for powder material, the unprocessed powder material remaining around and inside the product must be removed when the product is accomplished. The conventional three-dimensional products are usually designed to have closed or open structures which has a plurality of lattice bodies of which one is shown in FIG. 1. The lattice body shown in FIG. 1 has through holes only in one direction. The product formed by such closed or open structures causes a difficult removal of the unprocessed powder material and sometime it is not possible to remove. The residual of the powder material in the product causes a problem in quality control as well as a burden of processing procedures and cost.

BRIEF SUMMARY OF THE INVENTION

An object of the invention is to provide a ventilated three dimensional structure made from additive manufacturing, which has an opening and includes venting holes in three orthogonal directions so as to form mutually intersected air flow paths in the product. When the manufacturing process of the product is completed, air flow is introduced into the product and moves along the air paths, whereby the unprocessed or un-sintered powder material is carried by the air flow and hence removed from the product very quickly. The unprocessed powder material is prevented from remaining in the product.

The invention provides a ventilated three dimensional structure made from additive manufacture. The ventilated three dimensional structure in accordance with an exemplary embodiment of the invention includes a plurality of lattice bodies arranged and stacked in a first direction, a second direction and a third direction. The first direction, the second direction and the third direction are orthogonal. A first gap is formed between the adjacent lattice bodies in the first direction, a second gap is formed the adjacent lattice bodies in the second direction, and the adjacent lattice bodies are connected to each other in the third direction. Each of the lattice body has a hollow structure formed by a shell wall comprising a first venting hole opening along the first direction and facing the first venting hole of another adjacent one of the lattice bodies, a second venting hole opening towards the second direction and facing the second venting hole of another adjacent one of the lattice bodies; and a third venting hole opening towards the third direction and facing the third venting hole of another adjacent one of the lattice bodies.

In another exemplary embodiment, the shell wall further includes a first axial end wall, a second axial end wall and a peripheral wall, the first axial end wall is opposite to the second axial end wall, the peripheral wall connects the first axial end wall and the second axial end wall, the first axial end wall of one of the lattice bodies abuts the second axial end wall of another adjacent one of the lattice bodies in the third direction, the peripheral wall of one of the lattice bodies is spaced to the peripheral wall of another adjacent one of the lattice bodies in the first direction by a first gap, and the peripheral wall of one of the lattice bodies is spaced to the peripheral wall of another adjacent one of the lattice bodies in the second direction by a second gap.

In yet another exemplary embodiment, the first venting hole and the second venting hole are formed on the peripheral wall, and the third venting holes are formed on the first axial end wall and the second axial end wall.

In another exemplary embodiment, the peripheral wall comprises a plurality of joining surfaces, a plurality of first surfaces and a plurality of second surfaces, the joining surfaces, the first surfaces and the second surfaces are alternately arranged with respect to an axis along the third direction, the first surface has a normal direction parallel to the first direction, the second surface has a normal direction parallel to the second direction, and the joining surfaces has two opposite side adjacent to the first surface and the second surface respectively.

In yet another exemplary embodiment, the first venting hole is formed on the first surface, and the second venting hole is formed on the second surface.

In another exemplary embodiment, the joining surface of one lattice body joins the joining surface of another adjacent lattice body, the first surface of one of the lattice bodies is spaced to the first surface of another adjacent one of the lattice bodies, and the second surface of one of the lattice bodies is spaced to the second surface of another adjacent one of the lattice bodies.

In yet another exemplary embodiment, the first surface of one of the lattice bodies is adjacent to the second surface of another one of the lattice bodies joining the one of the lattice bodies with the joining surfaces.

In another exemplary embodiment, the first surface of one of the lattice bodies is adjacent to the second surface of another one of the lattice bodies stacked to the one of the lattice bodies in the third direction.

In yet another exemplary embodiment, each of the first surface comprises a first upper inclined surface having a first inclined angle with respect to the third direction and a first lower inclined surface having a second inclined angle with respect to the third direction, and the first venting hole is formed on the first upper inclined surface.

In another exemplary embodiment, each of the second surface comprises a second upper inclined surface having a third inclined angle with respect to the third direction and a second lower inclined surface having a fourth inclined angle with respect to the third direction, and the second venting hole is formed on the second lower inclined surface.

In yet another exemplary embodiment, the joining surface has a width gradually decreased from a joining position of the first upper inclined surface and the first lower inclined surface and a joining position of the second upper inclined surface and the second lower inclined surface to the first axial end surface and the second axial end surface respectively.

In another exemplary embodiment, the second upper inclined surface has a width gradually decreased from the first axial end wall to a joining position of the second upper inclined surface and the second lower inclined surface, and the second lower inclined surface has a width gradually decreased from the second axial end wall to the joining position of the second upper inclined surface and the second lower inclined surface.

In yet another exemplary embodiment, the first upper inclined surface has a width gradually decreased from the first axial end wall to a joining position of the first upper inclined surface and the first lower inclined surface, and the first lower inclined surface has a width gradually decreased from the second axial end wall to the joining position of the first upper inclined surface and the first lower inclined surface.

In another exemplary embodiment, a normal direction of the joining surface has an equal angular distance to a normal direction of the first surface and a normal direction of the second surface respectively.

In yet another exemplary embodiment, the first venting hole has a shape identical to a shape of the first upper inclined surface, and the first venting hole has an area being 50% to 70% of an area of the first upper inclined surface; the second venting hole has a shape identical to a shape of the second lower inclined surface, and the second venting hole has an area being 50% to 70% of an area of the second lower inclined surface; the third venting hole has a shape identical to a shape of the first axial end wall or the second axial end wall, and the third venting hole has an area being 50% to 70% of an area of the first axial end wall or the second axial end wall.

In another exemplary embodiment, the first venting hole has a shape different from a shape of the first upper inclined surface, and the first venting hole has an area ranging 30% to 50% of an area of the first upper inclined surface; the second venting hole has a shape different from a shape of the second lower inclined surface, and the second venting hole has an area ranging from 30% to 50% of an area of the second lower inclined surface; the third venting hole has a shape identical to a shape of the first axial end wall or the second axial end wall, and the third venting hole has an area being 50% to 70% of an area of the first axial end wall or the second axial end wall.

Since the ventilated three dimensional structure made from additive manufacture has a structure formed by alternately arranged lattice bodies and gaps in the first and second directions and by stacked lattice bodies in the third direction, the first venting holes of adjacent lattice bodies correspond to each other in the first direction, the second venting holes of adjacent lattice bodies correspond to each other in the second direction, and the third venting holes of adjacent lattice bodies correspond to each other in the third direction. Such an arrangement of the first venting holes, the second venting holes and the third venting holes constitutes mutually intersected air flow paths. When air is introduced into the air flow paths, the unprocessed powder material is carried by the air flow and moved along the air flow paths until the unprocessed powder material is removed from the product. In addition, the lattice bodies are stacked in the third direction and other directions equally spaced to the first and second directions, whereby the stack of the lattice bodies provides the structural strength of the ventilated three dimensional structure in each direction. The first gap in the first direction and the second gap in the second direction provide the spaces for deformation of the lattice body, which increases deformability of the product and hence increases the flexibility of the product.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
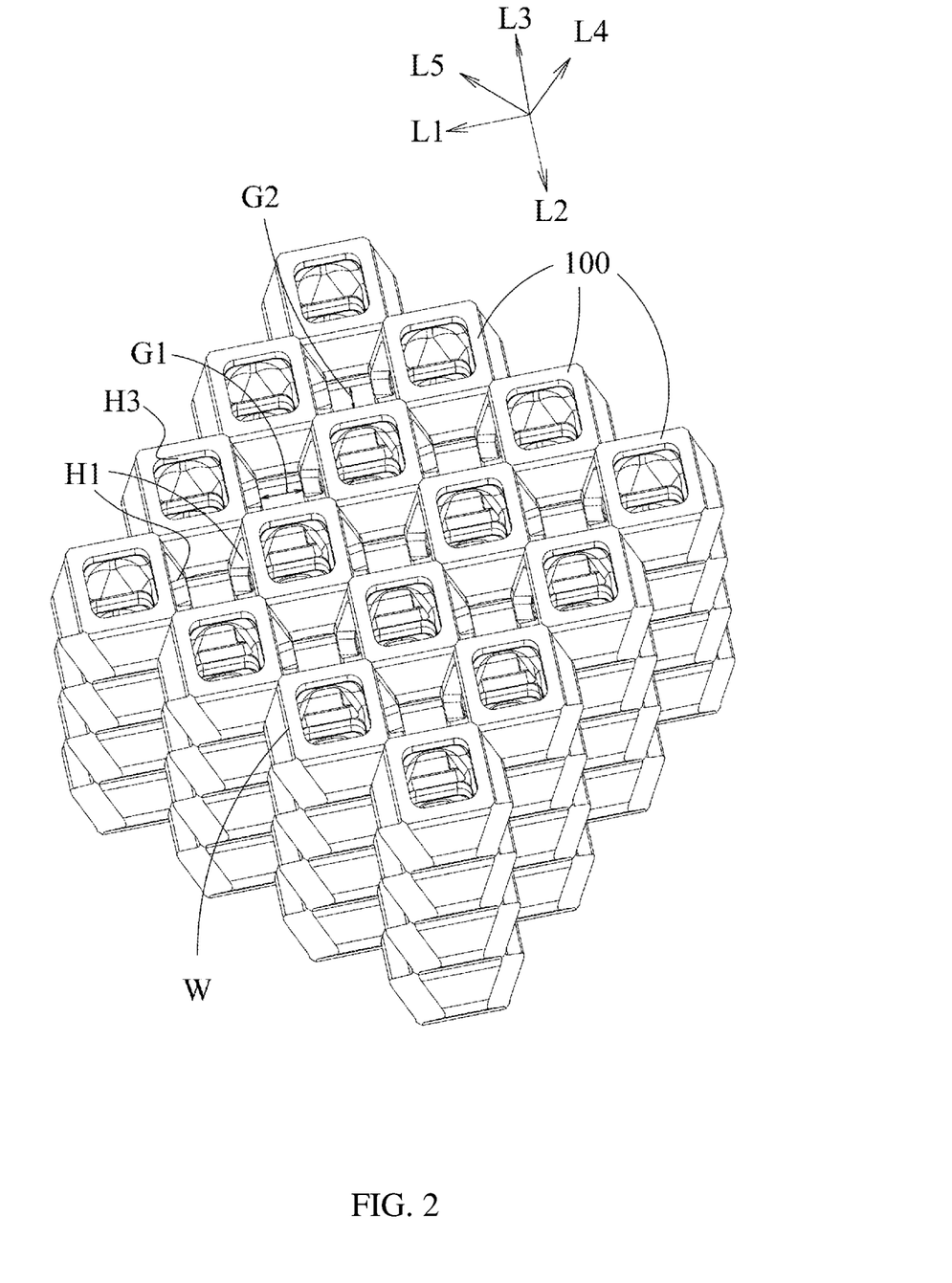
FIG. 2 is a perspective view of an embodiment of a ventilated three dimensional structure made from additive manufacture of the present invention.

Referring to FIGS. 2, 3, 4 and 5, a ventilated three dimensional structure made from additive manufacture of the present invention is disclosed. An embodiment of the ventilated three dimensional structure of the present invention includes a plurality of lattice bodies 100 stacked or arranged in a first direction L1, a second direction L2 and a third direction L3. The first direction L1, the second direction L2 and the third direction L3 are mutually orthogonal. In this embodiment, the first direction L1, the second direction L2 and the third direction L3 correspond to the x axis, the y axis and the z axis of a three dimensional orthogonal coordinate system. As illustrated in FIG. 2, a first gap G1 is formed between the adjacent lattice bodies 100 in the first direction L1, a second gap G2 is formed between the adjacent lattice bodies 100 in the second direction L2, and the lattice body 100 abuts the adjacent lattice bodies 100 in the third direction L3. The lattice body 100 abuts the adjacent lattice bodies 100 in a fourth direction L4 and a fifth direction L5. The fourth direction L4 and the fifth direction L5 are on the plane determined by the vectors along the first direction L1 and the second direction L2. The fourth direction L4 is angularly spaced from the first direction L1 and the second direction L2 by an equal angle, and the fifth direction L5 is also angularly spaced from the first direction L1 and the second direction L2 by an equal angle. The first gap G1 at one planar layer communicate with the adjacent first gap G1 in the adjacent planar layer. The second gap G2 at one planar layer communicate with the adjacent first gap G1 in the adjacent planar layer. The planar layer is formed by the lattice bodies 100 in the plane determined by the vectors along the first direction L1 and the second direction L2.

Figure 6:
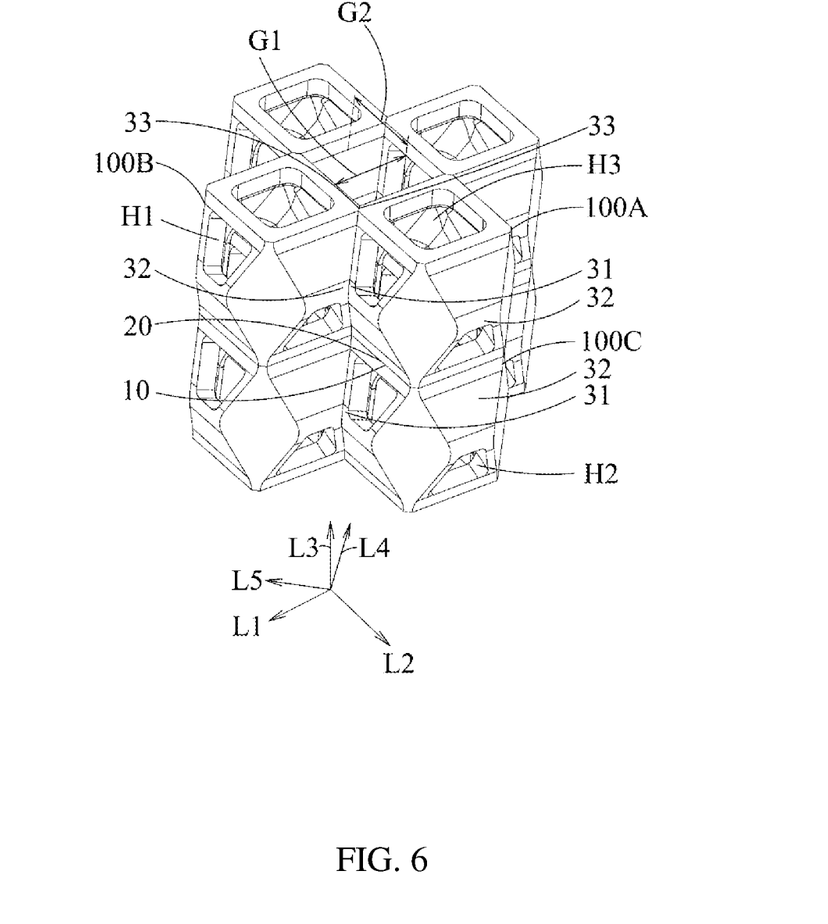
FIG. 6 is a perspective view of the ventilated three dimensional structure of the present invention having a stack of the lattice bodies of minimal amount in the first, second and third directions.
Figure 7:
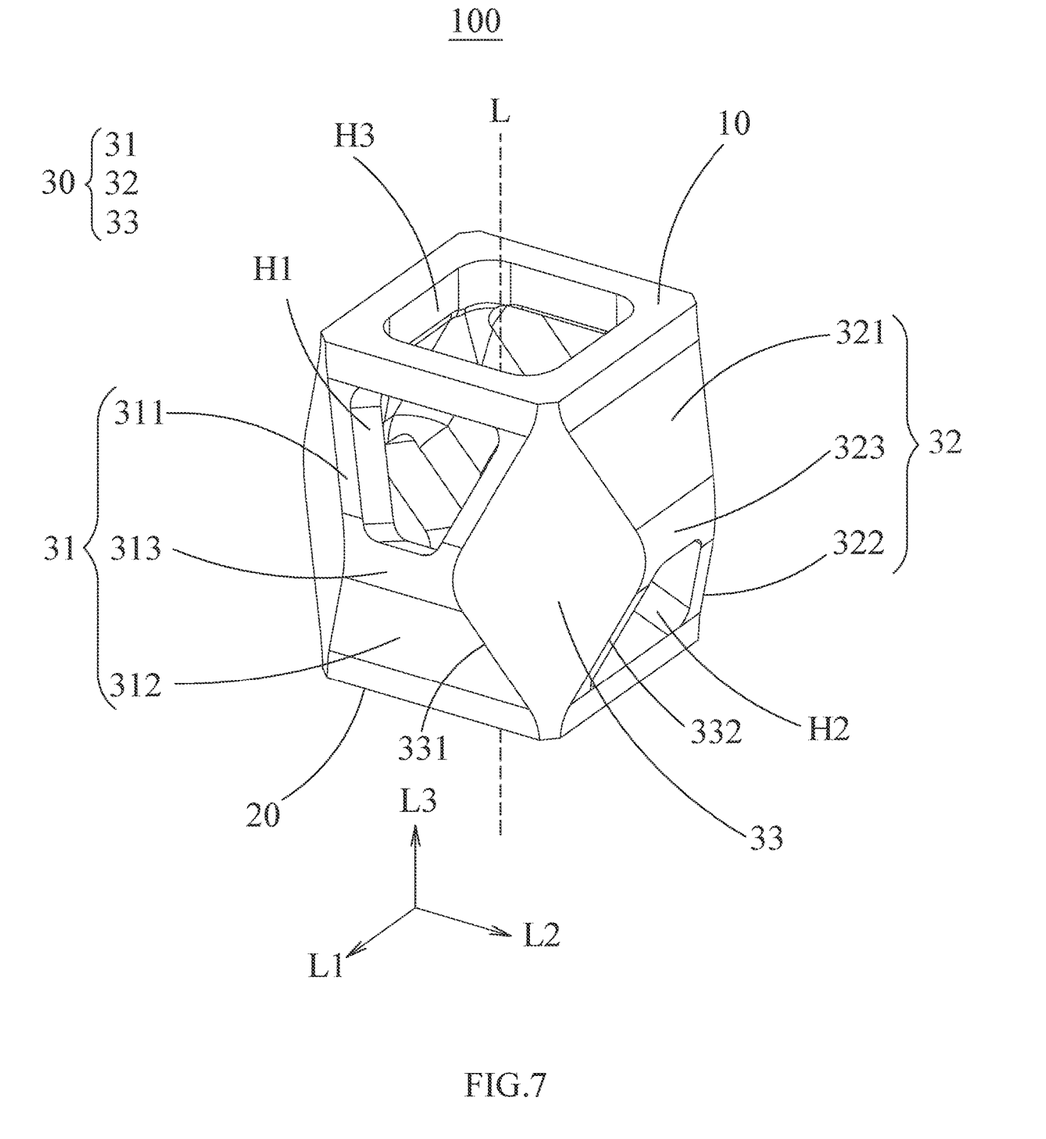
FIG. 7 is a perspective view of the first embodiment of a lattice body of the ventilated three dimensional structure of the present invention.

Referring to FIGS. 6 and 7, each lattice body 100 has a hollow structure formed by a shell wall W. The shell wall W includes a plurality of first venting holes H1, a plurality of second venting holes H2 and a plurality of third venting holes H3. The first venting hole H1 opens in the first direction and faces the first venting hole H1 of another adjacent one of the lattice bodies 100. The second venting hole H2 opens in the second direction L2 and faces the second venting hole H2 of another adjacent one of the lattice bodies 100. The third venting hole H3 opens in the third direction L3 and faces the third venting hole H3 of another adjacent one of the lattice bodies 100. The first venting holes H1 of the lattice bodies 100 in the first direction L1 constitute a linear air flow path. Similarly, the second venting holes H2 of the lattice bodies 100 in the second direction L2 constitute a linear air flow path, and the third venting holes H3 of the lattice bodies 100 in the third direction L3 also constitute a linear air flow path. Therefore, the powder material remaining in the three dimensional structure is carried by the air flow during post-process and moved along the air flow path until it is removed from the three dimensional structure. The structure of the lattice body 100 is described as follows.

Figure 3:
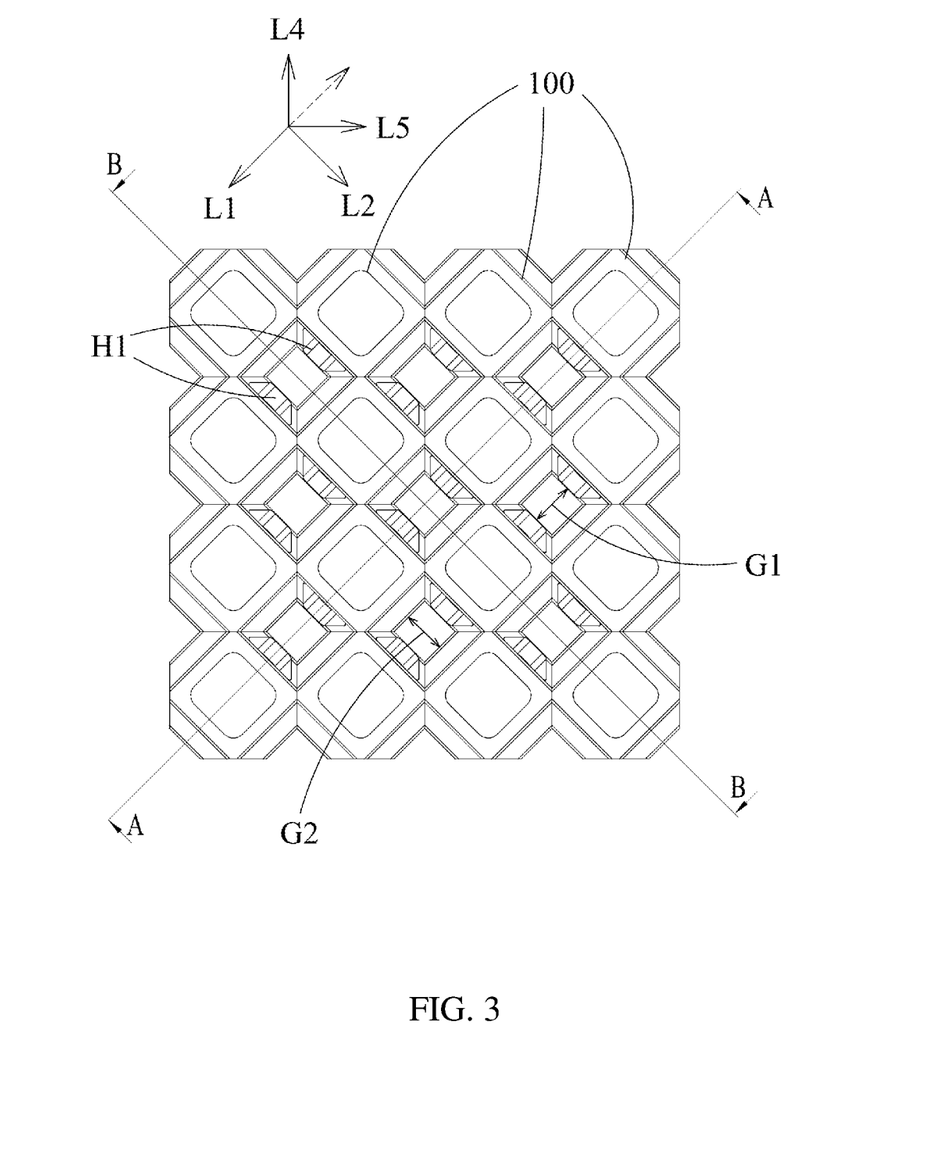
FIG. 3 is a top view of the ventilated three dimensional structure of FIG. 2.
Figure 4:
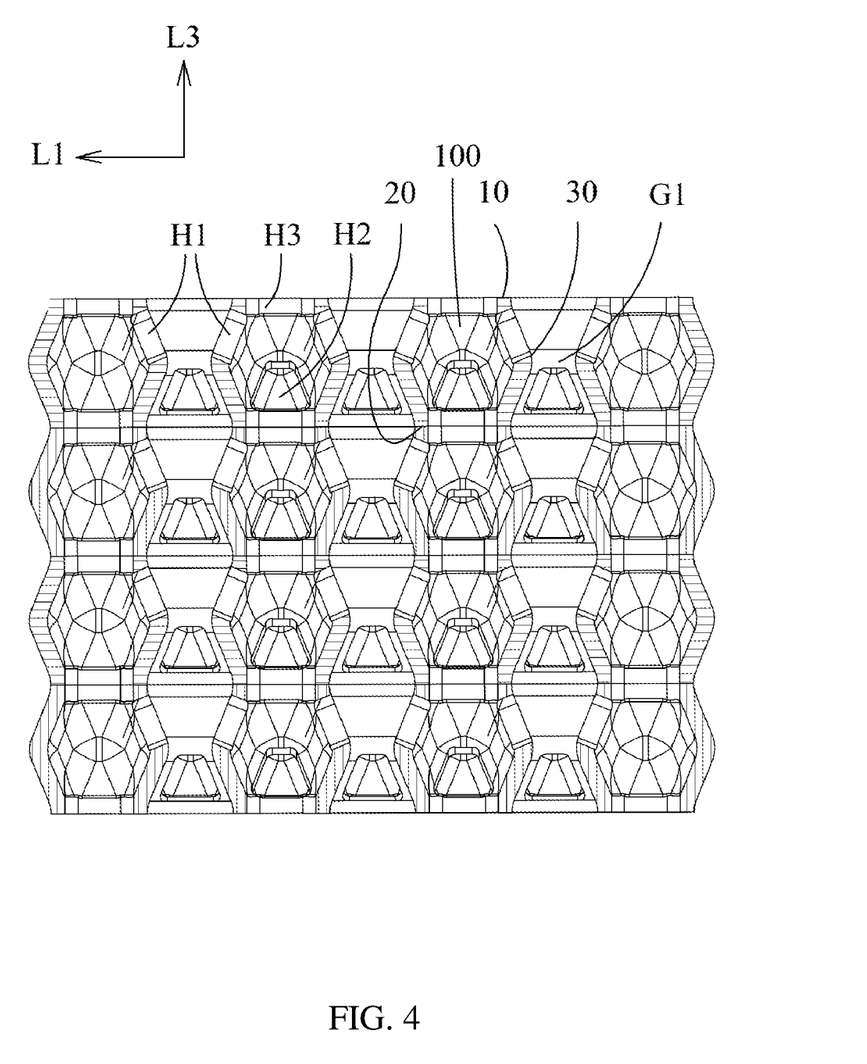
FIG. 4 is a cross section of the ventilated three dimensional structure of the present invention along the line A-A of FIG. 3.
Figure 5:
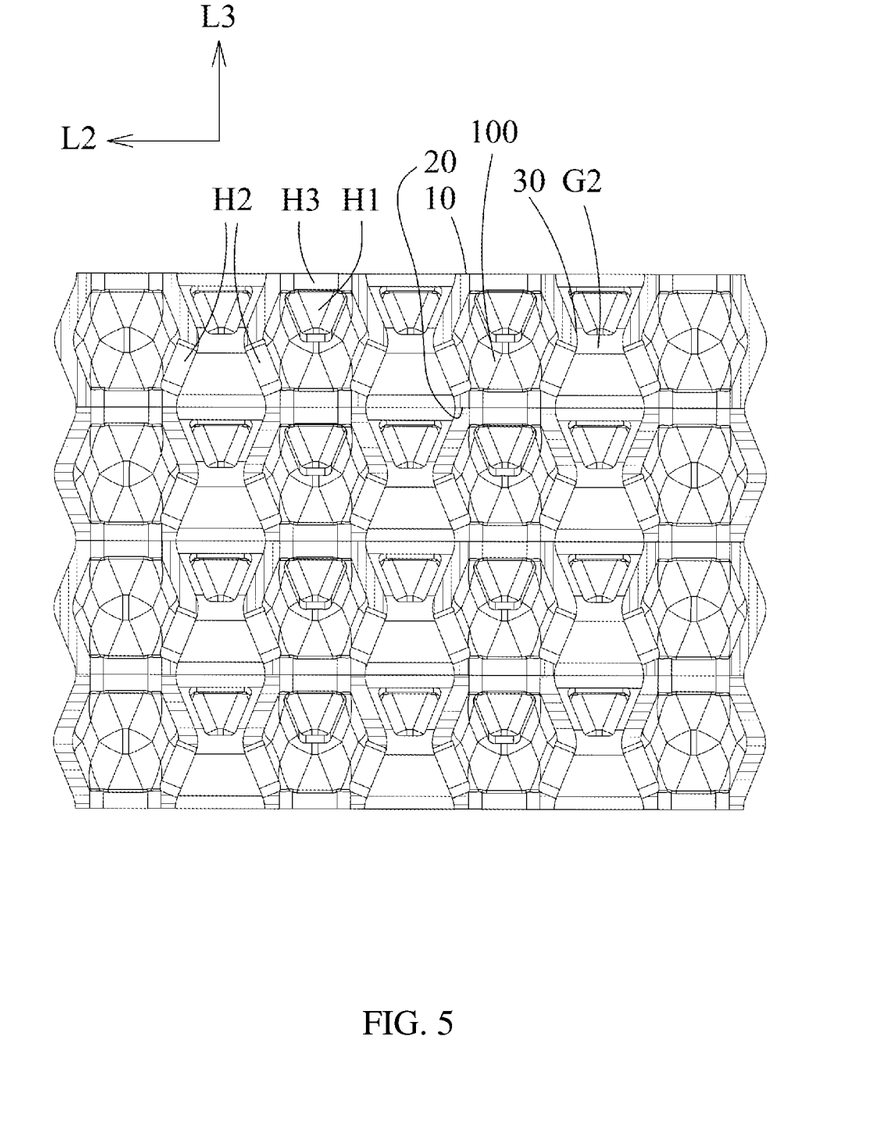
FIG. 5 is a cross section of the ventilated three dimensional structure of the present invention along the line B-B of FIG. 3.

Referring to FIGS. 2, 3 and 4, the shell wall W of the lattice body 100 further includes a first axial end wall 10, a second axial end wall 20 and a peripheral wall 30. The first axial end wall 10 is opposite to the second axial end wall 20, and the peripheral wall 30 connects the first axial end wall 10 and the second axial end wall 20. The first axial end wall 10 of one lattice body 100 abuts the second axial end wall 20 of another adjacent lattice bodies in the third direction L3. The peripheral wall 30 of one lattice body 100 is spaced to the peripheral wall 30 of another adjacent lattice body 100 in the first direction L1 by the first gap G1, and the peripheral wall 30 of one lattice body 100 is spaced to the peripheral wall 30 of another adjacent lattice body 100 in the second direction L2 by the second gap G2. In the present embodiment, the width of the first gap G1 is equal to the width of the second gap G2. The first venting hole H1 and the second venting hole H2 are formed on the peripheral wall 30, and the third venting holes H3 are formed on the first axial end wall 10 and the second axial end wall 20. The space formed by the first gap G1 and the second gap G2 communicates with the interior of the shell wall W through the first venting holes H1 or the second venting holes H2.

Referring to FIGS. 6 and 7, the peripheral wall 30 includes a plurality of first surfaces 31, a plurality of second surfaces 32 and a plurality of joining surfaces 33. The first surfaces 31, the second surfaces 32 and the joining surfaces 33 are alternately arranged with respect to an axis along the third direction L3. The first surface 31 has a normal direction parallel to the first direction L1, the second surface 32 has a normal direction parallel to the second direction L2, and the joining surface 33 has two opposite sides 331 and 332 adjacent to the first surface 31 and the second surface 32 respectively. Also referring to FIG. 2, the joining surfaces 33 have a normal direction parallel to the fourth direction L4 or the fifth direction L5. The fourth direction L4 is angularly spaced from the first direction L1 and the second direction L2 by an equal angle, and the fifth direction L5 is also angularly spaced from the first direction L1 and the second direction L2 by an equal angle. Therefore, in the present embodiment, the angle between the normal direction of the joining surface 33 and the normal direction of the first surface 31 is equal to the angle between the normal direction of the joining surface 33 and the normal direction of the second surface 32.

Referring to FIG. 6, the joining surface 33 of the lattice body 100A joins the joining surface 33 of another adjacent lattice body 100B. As aforementioned, the joining surface 33 faces the fourth direction L4 or the fifth direction L5, and therefore each lattice body 100 is connected to another adjacent lattice body 100 in the fourth direction L4 or the fifth direction L5. The first gap G1 is formed between the first surfaces 31 of two adjacent lattice bodies 100 in the first direction L1. The second gap G2 is formed between the second surfaces 32 of two adjacent lattice bodies 100 in the second direction L2. The first surface 31 of one lattice body 100A abuts the second surface 32 of another adjacent lattice body 100B joining the lattice body 100A with the joining surfaces 33. The first surface 31 of one lattice body 100A abuts the first surface 31 of another adjacent lattice body 100C stacked to the lattice body 100A in the third direction L3. Similarly, the second surface 32 of one lattice body 100A abuts the second surface 32 of the adjacent lattice body 100C stacked to the lattice body 100A in the third direction L3.

Referring to FIG. 7, each first surface 31 includes a first upper inclined surface 311 having a first inclined angle with respect to an axis L parallel to the third direction L3 and a first lower inclined surface 312 having a second inclined angle with respect to the axis L parallel to the third direction L3, and the first venting hole H1 is formed on the first upper inclined surface 311. Each second surface 32 includes a second upper inclined surface 321 having a third inclined angle with respect to the axis L parallel to the third direction L3 and a second lower inclined surface 322 having a fourth inclined angle with respect to the axis L parallel to the third direction L3, and the second venting hole H2 is formed on the second lower inclined surface 322. As the first venting holes H1 and the second venting holes H2 are disposed at different height, the air flow path constituted by the first venting holes H1 and the air flow path constituted by the first venting holes H2 are located at different height. Therefore, the unprocessed powder material remaining either in the vicinity of the first axial end wall 10 or in the vicinity of the second axial end wall 20 can be removed by air flow along the air flow paths during the post-processing of the additively manufactured structure.

The joining surface 33 is a plane parallel to the third direction L3 and connects the first axial end wall 10 and the second axial end wall 20. The joining surface 33 has a width gradually decreased from a joining position 313 of the first upper inclined surface 311 and the first lower inclined surface 312 and from a joining position 323 of the second upper inclined surface 321 and the second lower inclined surface 322 to the first axial end surface 10 and the second axial end surface 20 respectively.

The first upper inclined surface 311 has a width gradually decreased from the first axial end wall 10 to the joining position 313 of the first upper inclined surface 311 and the first lower inclined surface 312, and the first lower inclined surface 312 has a width gradually decreased from the second axial end wall 20 to the joining position 313 of the first upper inclined surface 311 and the first lower inclined surface 312. In the present embodiment, the first upper inclined surface 311 and the first lower inclined surface 312 are trapezoid.

The second upper inclined surface has a width gradually decreased from the first axial end wall 10 to the joining position 323 of the second upper inclined surface 321 and the second lower inclined surface 322, and the second lower inclined surface 322 has a width gradually decreased from the second axial end wall 20 to the joining position 323 of the second upper inclined surface 321 and the second lower inclined surface 322. In the present embodiment, the second upper inclined surface 321 and the second lower inclined surface 322 are trapezoid.

In addition, in the present embodiment, the first venting hole H1 has a shape identical to that of the first upper inclined surface 311. Since the first upper inclined surface 311 is a trapezoid as aforementioned, the first venting hole H1 is also a trapezoid and has an area ranging from 50% to 70% of an area of the first upper inclined surface 311. The second venting hole H2 has a shape identical to that of the second lower inclined surface 322. Since the second lower inclined surface 322 is a trapezoid as aforementioned, the second venting hole H2 is also a trapezoid and has an area ranging from 50% to 70% of an area of the second lower inclined surface 322. The third venting hole H3 has a shape identical to a shape of the first axial end wall 10 or the second axial end wall 20. As the first axial end wall 10 and the second axial end wall 20 are square, the third venting hole H3 is also a square and has an area ranging from 50% to 70% of an area of the first axial end wall 10 or the second axial end wall 20.

Figure 8:
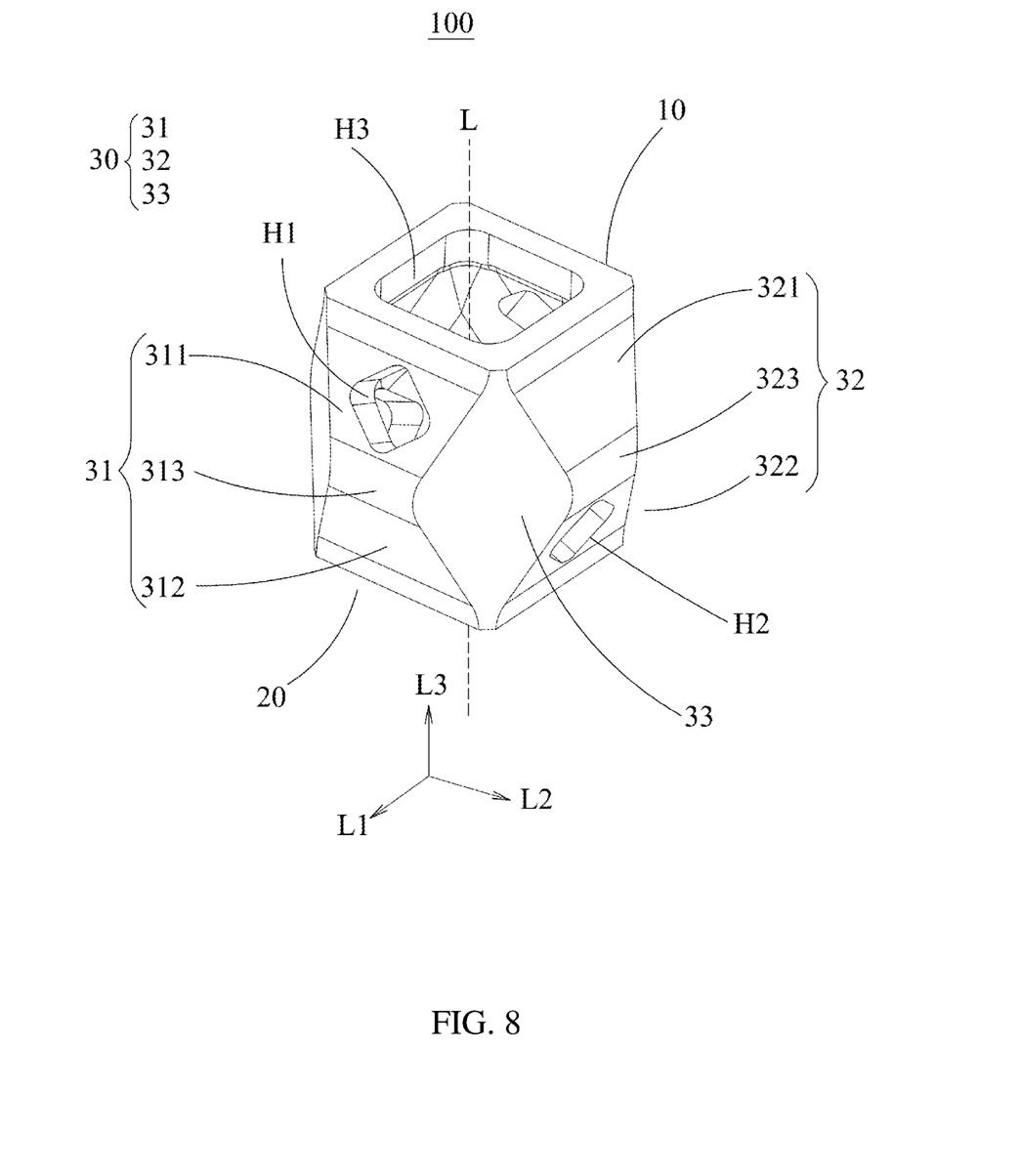
FIG. 8 is a perspective view of the second embodiment of a lattice body of the ventilated three dimensional structure of the present invention.

FIG. 8 depicts the second embodiment of the lattice body of the ventilated three dimensional structure of the present invention. The lattice body 100 of the present embodiment has a part of structure the same as the first embodiment illustrated in FIG. 7. Therefore, the same numerical is given for the same member in the first embodiment and the present embodiment. The first venting hole H1 has a shape different from that of the first upper inclined surface 311. The first venting hole H1 is a square and has an area being 30% to 50% of the area of the first upper inclined surface 311. The second venting hole H2 has a shape different from that of the second lower inclined surface 322. The second venting hole H2 is a square and has an area being 30% to 50% of the area of the second lower inclined surface 322.

In another embodiment, the first upper inclined surface includes a plurality of first venting holes, and the second lower inclined surface includes a plurality of second venting holes. The first venting holes and the second venting holes have a size greater than that of the powder material. The first venting holes and the second venting holes have identical sizes or different sizes.

Since the ventilated three dimensional structure made from additive manufacture has a structure formed by alternately arranged lattice bodies and gaps in the first and second directions and by stacked lattice bodies in the third direction, the first venting holes of adjacent lattice bodies correspond to each other in the first direction, the second venting holes of adjacent lattice bodies correspond to each other in the second direction, and the third venting holes of adjacent lattice bodies correspond to each other in the third direction. Such an arrangement of the first venting holes, the second venting holes and the third venting holes constitutes mutually intersected air flow paths. When air is introduced into the air flow paths, the unprocessed powder material is carried by the air flow and moved along the air flow paths until the unprocessed powder material is removed from the product. The ventilated three dimensional structure of the present invention facilitates the powder removal of the un-processed powder compared to structures made of other surface or shell based lattice designs. In addition, the lattice bodies are stacked in the third direction and other directions equally spaced to the first and second directions, whereby the stack of the lattice bodies provides the structural strength of the ventilated three dimensional structure in each direction. The first gap in the first direction and the second gap in the second direction provide the spaces for deformation of the lattice body, which increases deformability of the product and hence increases the flexibility of the product. In addition, the ventilated three dimensional structure from additive manufacture can be applied to the powder material of ceramic, metal and polymer. The proposed lattice structure is designed to minimize the post-printing challenges of powder and resin based additive manufacturing methods. These kinds of lattice structure can simplify the long and difficult post-printing removal of unprocessed powder or resin by blowing air in the additively manufacture parts.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A ventilated three dimensional structure from additive manufacturing, comprising: a plurality of lattice bodies arranged and stacked in a first direction, a second direction and a third direction;
   wherein the first direction, the second direction and the third direction are orthogonal;
   wherein a first gap is formed between the adjacent lattice bodies in the first direction, a second gap is formed the adjacent lattice bodies in the second direction, and the adjacent lattice bodies are connected to each other in the third direction;
   wherein each of the lattice body has a hollow structure formed by a shell wall comprising a first venting hole opening along the first direction and facing the first venting hole of another adjacent one of the lattice bodies, a second venting hole opening towards the second direction and facing the second venting hole of another adjacent one of the lattice bodies; and a third venting hole opening towards the third direction and facing the third venting hole of another adjacent one of the lattice bodies;

wherein the shell wall further comprising a first axial end wall, a second axial end wall and a peripheral wall, the first axial end wall is opposite to the second axial end wall, the peripheral wall connects the first axial end wall and the second axial end wall, the first axial end wall of one of the lattice bodies abuts the second axial end wall of another adjacent one of the lattice bodies in the third direction;

wherein the peripheral wall comprises a plurality of joining surfaces, the joining surface of one lattice body joins the joining surface of another adjacent lattice body;

wherein the joining surfaces are planes and directly connected to the first axial end wall and the second axial end wall.

2. The ventilated three dimensional structure as claimed in claim 1, wherein the peripheral wall of one of the lattice bodies is spaced to the peripheral wall of another adjacent one of the lattice bodies in the first direction by the first gap, and the peripheral wall of one of the lattice bodies is spaced to the peripheral wall of another adjacent one of the lattice bodies in the second direction by the second gap.

3. The ventilated three dimensional structure as claimed in claim 2, wherein the first venting hole and the second venting hole are formed on the peripheral wall, and the third venting holes are formed on the first axial end wall and the second axial end wall.

4. The ventilated three dimensional structure as claimed in claim 2, wherein the peripheral wall further comprises a plurality of first surfaces and a plurality of second surfaces, the joining surfaces, the first surfaces and the second surfaces are alternately arranged with respect to an axis along the third direction, the first surface has a normal direction parallel to the first direction, the second surface has a normal direction parallel to the second direction, and the joining surfaces has two opposite sides adjacent to the first surface and the second surface respectively.

5. The ventilated three dimensional structure as claimed in claim 4, wherein the first venting hole is formed on the first surface, and the second venting hole is formed on the second surface, and no hole is formed on the joining surfaces.

6. The ventilated three dimensional structure as claimed in claim 4, wherein the first surface of one of the lattice bodies is spaced to the first surface of another adjacent one of the lattice bodies, and the second surface of one of the lattice bodies is spaced to the second surface of another adjacent one of the lattice bodies.

7. The ventilated three dimensional structure as claimed in claim 6, wherein the first surface of one of the lattice bodies abuts the second surface of another one of the lattice bodies joining the one of the lattice bodies with the joining surfaces.

8. The ventilated three dimensional structure as claimed in claim 6, wherein the first surface of one of the lattice bodies abuts the second surface of another one of the lattice bodies stacked to the one of the lattice bodies in the third direction.

9. The ventilated three dimensional structure as claimed in claim 4, wherein each of the first surface comprises a first upper inclined surface having a first inclined angle with respect to the third direction and a first lower inclined surface having a second inclined angle with respect to the third direction, and the first venting hole is formed on the first upper inclined surface.

10. The ventilated three dimensional structure as claimed in claim 9, wherein the first upper inclined surface has a width decreased from the first axial end wall to a joining position of the first upper inclined surface and the first lower inclined surface, and the first lower inclined surface has a width decreased from the second axial end wall to the joining position of the first upper inclined surface and the first lower inclined surface.

11. The ventilated three dimensional structure as claimed in claim 9, wherein a normal direction of the joining surface has an equal angular distance to a normal direction of the first surface and a normal direction of the second surface respectively.

12. The ventilated three dimensional structure as claimed in claim 9, wherein the first venting hole has a shape identical to a shape of the first upper inclined surface, and the first venting hole has an area ranging from 50% to 70% of an area of the first upper inclined surface; the second venting hole has a shape identical to a shape of the second lower inclined surface, and the second venting hole has an area ranging from 50% to 70% of an area of the second lower inclined surface; the third venting hole has a shape identical to a shape of the first axial end wall or the second axial end wall, and the third venting hole has an area ranging from 50% to 70% of an area of the first axial end wall or the second axial end wall.

13. The ventilated three dimensional structure as claimed in claim 9, wherein the first venting hole has a shape different from a shape of the first upper inclined surface, and the first venting hole has an area ranging 30% to 50% of an area of the first upper inclined surface; the second venting hole has a shape different from a shape of the second lower inclined surface, and the second venting hole has an area ranging from 30% to 50% of an area of the second lower inclined surface; the third venting hole has a shape identical to a shape of the first axial end wall or the second axial end wall, and the third venting hole has an area being 50% to 70% of an area of the first axial end wall or the second axial end wall.

14. The ventilated three dimensional structure as claimed in claim 9, wherein each of the second surface comprises a second upper inclined surface having a third inclined angle with respect to the third direction and a second lower inclined surface having a fourth inclined angle with respect to the third direction, and the second venting hole is formed on the second lower inclined surface.

15. The ventilated three dimensional structure as claimed in claim 14, wherein the first upper inclined surface is directly connected to the first lower inclined surface, and the second upper inclined surface is directly connected to the second lower inclined surface.

16. The ventilated three dimensional structure as claimed in claim 9, wherein the joining surface has a width decreased from a joining position of the first upper inclined surface and the first lower inclined surface and a joining position of the second upper inclined surface and the second lower inclined surface to the first axial end wall and the second axial end wall respectively.

17. The ventilated three dimensional structure as claimed in claim 16, wherein the second upper inclined surface has a width decreased from the first axial end wall to a joining position of the second upper inclined surface and the second lower inclined surface, and the second lower inclined surface has a width decreased from the second axial end wall to the joining position of the second upper inclined surface and the second lower inclined surface.

18. The ventilated three dimensional structure as claimed in claim 9, wherein each of the first upper inclined surfaces has a plurality of the first venting holes, and each of the second lower inclined surface has a plurality of second venting holes, and each of the first lower inclined surfaces has no hole, and each of the second upper inclined surface has no holes, and each of the first venting holes and each of the second venting holes have a size greater than that of the powder material.

19. The ventilated three dimensional structure as claimed in claim 18, wherein the first venting holes have identical or different sizes, and the second venting holes have identical or different sizes.

20. The ventilated three dimensional structure as claimed in claim 18, wherein the first upper inclined surface has a plurality of perforated holes, the second lower inclined surface has a plurality of perforated holes, and each of the perforated holes has a size greater than that of the powder material.

\* \* \* \* \*